United States Patent
Wollin

(10) Patent No.: US 6,452,390 B1
(45) Date of Patent: Sep. 17, 2002

(54) MAGNETIC RESONANCE ANALYZING FLOW METER AND FLOW MEASURING METHOD

(75) Inventor: Ernest Wollin, Leesburg, FL (US)

(73) Assignee: Wollin Ventures, Inc., Leesburg, FL (US)

(*) Notice: Subject to any disclaimer, the term of this patent is extended or adjusted under 35 U.S.C. 154(b) by 0 days.

(21) Appl. No.: 09/711,914

(22) Filed: Nov. 15, 2000

Related U.S. Application Data
(60) Provisional application No. 60/165,825, filed on Nov. 16, 1999.

(51) Int. Cl.[7] .................................................. G01V 3/00
(52) U.S. Cl. ....................................... 324/306; 324/307
(58) Field of Search ................................ 324/306, 307, 324/308, 309, 312, 314, 300

(56) References Cited

U.S. PATENT DOCUMENTS

| | | | |
|---|---|---|---|
| 4,110,680 A | 8/1978 | Bergmann et al. | 324/306 |
| 4,455,527 A | 6/1984 | Singer | 324/316 |
| 4,716,367 A | * 12/1987 | Patz | 324/306 |
| 4,782,295 A | 11/1988 | Lew | 324/306 |
| 5,408,180 A | 4/1995 | Mistretta et al. | 324/306 |
| 5,412,322 A | 5/1995 | Wollin | 324/318 |
| 5,532,593 A | 7/1996 | Maneval | 324/248 |
| 5,677,631 A | 10/1997 | Reittinger | 324/324 |
| 5,757,187 A | 5/1998 | Wollin | 324/306 |
| 5,814,988 A | 9/1998 | Itskovich et al. | 324/303 |
| 5,828,214 A | 10/1998 | Taicher et al. | 324/303 |
| 6,046,587 A | * 4/2000 | King et al. | 324/306 |
| 6,111,408 A | 8/2000 | Blades | 324/303 |
| 6,111,409 A | 8/2000 | Edwards et al. | 324/303 |
| 6,133,733 A | 10/2000 | Lurie et al. | 324/300 |
| 6,166,540 A | 12/2000 | Wollin | 324/300 |

FOREIGN PATENT DOCUMENTS
EP  496 330  7/1992

OTHER PUBLICATIONS

Mansfield, P; Morris, P.G.: "NMR Imaging in Biomedicine"; Advances in Magnetic Resonance, Supplement 2; 1982, Academic Press, Inc. Orlando 32887; p. 235 section 7.3.5.

Cho, Z. et al.: "Foundations of Medical Imaging"; John Wiley & Sons, Inc., New York, 1993, p 374–386.

Slichter, C.P.: "Principles of Magnetic Resonance," third edition chapter 2, Springer–Verlag, N.Y. 1989.

(List continued on next page.)

Primary Examiner—Louis Arana
(74) Attorney, Agent, or Firm—Foley & Lardner

(57) ABSTRACT

A simplified magnetic resonance flowmeter and flow measuring method, based on the dwell time of spins in the $H_1$ Larmor radio frequency nutation field, which employs periodic $H_0$ field gradients to phase modulate the spins so as to measure mean velocity of flow in near uniform velocity profiles or to map velocity of flow in non-uniform velocity profiles, which does not require pulse techniques and is relatively independent of relaxation and diffusion parameters consisting of a magnetizing section of pipe with a strong $H_0$ magnetic field with a receiving section with orthogonal periodic phase modulating gradient coils, $H_1$ Larmor radio frequency excitation (nutation) coils, and sideband receiver coils; utilizing a demodulating and cross-correlating receiver and a control system that permits concordant analysis of composition.

36 Claims, 10 Drawing Sheets

OTHER PUBLICATIONS

Slichter, C.P.: "Principles of Magnetic Resonance," third edition chapter 4, Springer–Verlag, N.Y. 1989.

Shenberg, Itzhak and Macovski, Albert: "Applications of time–varying gradients in existing magnetic resonance imaging systems"; Med. Phys., vol. 13(2), p 164–169 Mar. 1982, N.Y.

Poularikas, Alexander D.: "The Transforms and Applications Handbook", CRC–IEEE press, Baca Raton, FL, 1996 pp. 29, 185, 214, 221.

Slichter, C.P.:"Principles of Magnetic Resonance", third edition, Springer–Verlag, NY 1989 ch. 2.8 p 35–39.

Spitzer, David W.: "Industrial Flow Measurement;" Instrument Society of America, 1990, p 97.

"NMR Measurements of Internal Magnetic Field Gradients Caused by the Presence of an Electric Current in Electrolyte Solutions", Journal of Magnetic Resonance 40, pp. 595–599, 1980.

Scott, G. C. et al.: "Measurement of Nonuniform Current Density by Magnetic Resonance", IEEE Transactions on Medical Imaging, vol. 10, No. 3, Sep. 1991, pp. 362–374.

\* cited by examiner

FIG. 7a

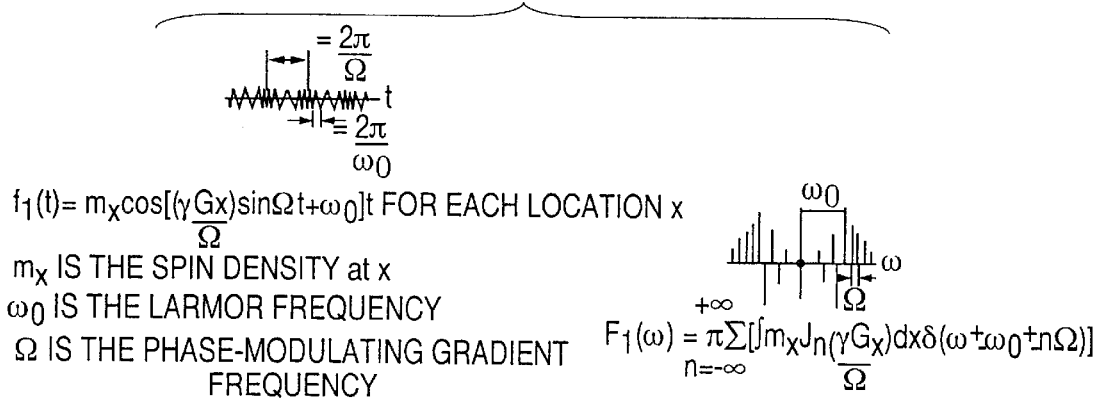

$f_1(t) = m_x \cos[(\gamma \underline{G_x}/\Omega) \sin\Omega t + \omega_0]t$ FOR EACH LOCATION x $m_x$ IS THE SPIN DENSITY at x
$\omega_0$ IS THE LARMOR FREQUENCY
$\Omega$ IS THE PHASE-MODULATING GRADIENT FREQUENCY $$F_1(\omega) = \pi \sum_{n=-\infty}^{+\infty} [\int m_x J_n(\gamma G_x/\Omega) dx \delta(\omega \pm \omega_0 \pm n\Omega)]$$

FIG. 7b

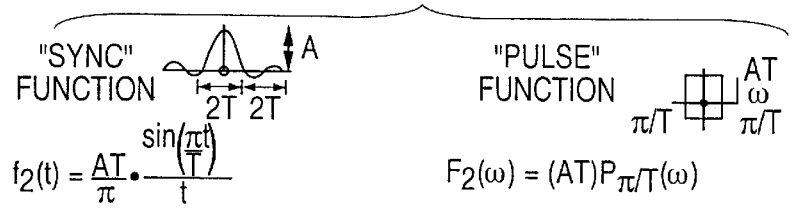

"SYNC" FUNCTION $f_2(t) = \frac{AT}{\pi} \cdot \frac{\sin(\pi t/T)}{t}$

"PULSE" FUNCTION $F_2(\omega) = (AT) P_{\pi/T}(\omega)$

FIG. 7c

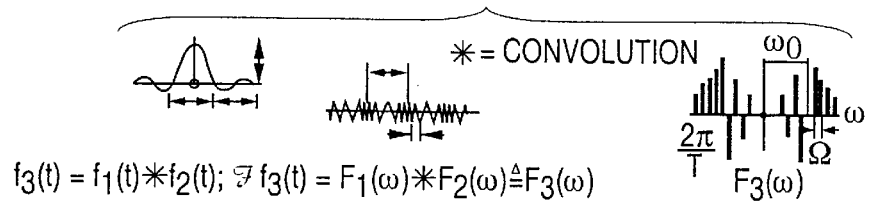

✶ = CONVOLUTION $f_3(t) = f_1(t) \ast f_2(t)$;  $\mathcal{F} f_3(t) = F_1(\omega) \ast F_2(\omega) \triangleq F_3(\omega)$ $\mathcal{F} f_4(t) \cdot f_3(t) = F_4(\omega) * F_3(\omega) = F_6(\omega)$

MAGNETIC RESONANCE ANALYZING FLOW METER AND FLOW MEASURING METHOD

This application claims benefit under 35 U.S.C. §119(e) of Provisional Application Ser. No. 60/165,825, filed Nov. 16, 1999.

BACKGROUND OF THE INVENTION

1. Field of the Invention

This invention relates generally to the measurement of relative flow between a fluid and a defined volume, such as a pipe, and more particularly, to the measurement of fluid flow and composition by nuclear or electron magnetic resonance.

2. Description of the Prior Art

The idea of studying flow by magnetic resonance dates back to the work of the early pioneers as described, for example, in Mansfield, P; Morris, P. G.; "NMR Imaging in Biomedicine"; Advances in Magnetic Resonance, Supplement 2; 1982; Academic Press, Inc. Orlando 32887; p.235 section 7.3.5. Prior art devices for flow measurement or flow mapping rely on two well-known methods viz. "Time-of-Flight" of saturated or unsaturated spins or "Phase-Encoding" by application of a gradient field along the direction of flow. (Cho, Z. et. al.; "Foundations of Medical Imaging;" John Wiley & Sons, Inc., New York, 1993, p374–386.) Exemplary of the "Time-of-Flight" method is U.S. Pat. No. 4,782,295 to Lew and of the "Phase-Encoding" method is U.S. Pat. No. 5,532,592 to Maneval. Analysis of chemical composition by chemical shift is discussed in "Principles of Magnetic Resonance," third edition chapter 4, by Slichter, C. P., Springer-Verlag, N.Y. 1989.

SUMMARY OF THE INVENTION

One preferred aspect of the present invention provides a universally applicable simplified method to non-invasively measure the mean value of, or to map the velocity profile of, the various domains of flow based on the dwell time of flowing spins within a defined space containing a constant uniform $H_1$ Larmor radio frequency excitation field.

Another preferred aspect of the invention provides a method to measure or map the signal received from moving spins within a defined space in the continuous presence of the $H_1$ Larmor radio frequency excitation field by periodically phase modulating the $H_0$ strong main magnetic field by a periodic gradient field so as to cause the spins to emit a line or band spectrum, centered at the Larmor frequency, whose sideband amplitudes are known functions of the amplitude of the center-band Larmor frequency signal emitted by the spins, said emitted center-band Larmor frequency signal amplitude being a known function of the dwell time of the spins within a defined space within the $H_1$ Larmor excitation field.

Another preferred aspect of the invention provides a method to continuously measure the very weak sidebands of the emitted signal from the phase modulated spins in the presence of the very strong $H_1$ central Larmor field by demodulating and then cross-correlating the received signal with integral multiples of the phase modulating frequency of the periodic gradient field.

In another preferred aspect of the invention, the amplitude of the phase modulating $H_0$ field is spatially ordered to permit the spatial mapping of the dwell time of the spins within a defined volume within the $H_1$ excitation Larmor field.

In another preferred aspect of the invention, the pulsed Larmor radio frequency fields and pulsed gradient fields are eliminated, thereby reducing or eliminating eddy currents, transients, and Gibbs truncation artifacts.

Another preferred aspect of the invention provides a method to measure or map the velocity or perfusion vector of the spins from the measurement of, or the map of, the dwell time of the spins within the known geometry of a defined portion of the $H_1$ Larmor excitation field, said known geometry being defined by a receiver coil preferably wound orthogonal to the $H_1$ Larmor excitation field coil so as to substantially decouple the noise from, and the signal from, the $H_1$ Larmor excitation field.

Another preferred aspect of the invention is to provide a measure of, or a map of, the flow velocity or perfusion vector within the known geometry of a defined portion of the $H_1$ Larmor excitation field constructed from measurements dependent on the dwell time of the spins in a defined portion of the $H_1$ Larmor frequency excitation field as measured with the known adjustable strength of that $H_1$ Larmor frequency excitation field, and not significantly dependent on the unknown $T_1$ spin-lattice, the unknown $T_2$ spin-spin, the unknown D diffusion, or on other unknown parameters affecting spin magnetization, spin diffusion, or spin coherence. These unknown parameters affect the signal-to-noise of the measurements of this invention, but not significantly the defined end point of these measurements, according to this invention.

A further preferred aspect of this invention is to perform a simultaneous chemical and physical analysis of the flowing material.

A further preferred aspect of this invention is a flow meter for performing one or more of the above methods.

BRIEF DESCRIPTION OF THE DRAWINGS

FIGS. 7a through 7i are graphs and formulas illustrating the operation of the circuit of FIG. 6 of one embodiment of this invention.

DETAILED DESCRIPTION OF THE PREFERRED EMBODIMENT

Figure 1:
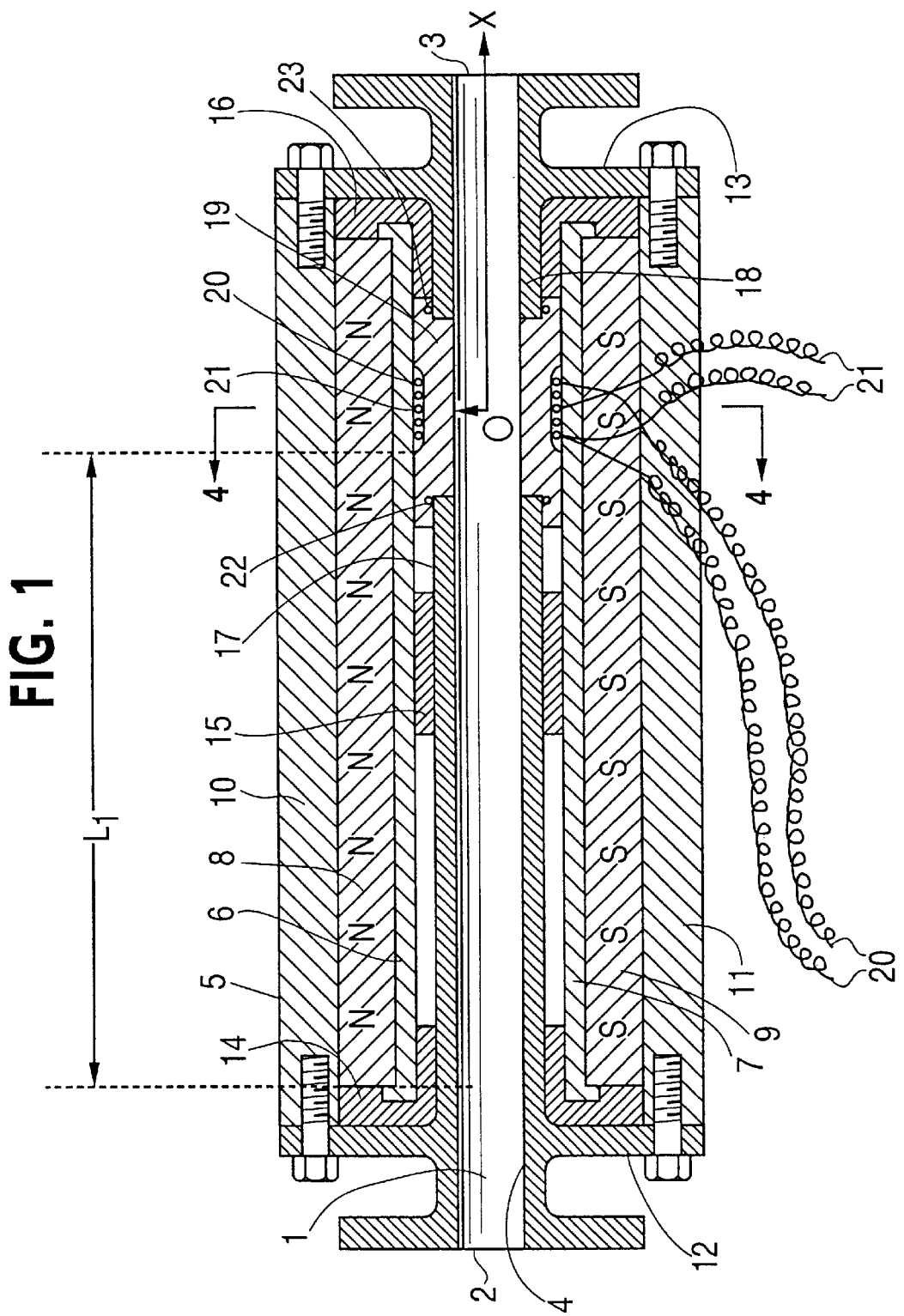
FIG. 1 is a cross section of an embodiment of the nuclear magnetic resonance flowmeter constructed in accordance with one embodiment of the present invention, which cross section is taken along a plane including the central axis of the flow passage.

FIG. 1 illustrates an embodiment in which the strong relatively homogenous $H_0$ static magnetic field required in all magnetic resonance devices is placed perpendicular to the mean axis of flow. In FIG. 1 there is shown a cross section of an embodiment of the nuclear magnetic resonance flowmeter constructed in accordance with the principles of the present invention, which cross section is taken along a plane including the central axis of the flow passage. The flow passage 1 extending from one extremity 2 to the other extremity 3 of the conduit 4 extends through a constant magnetic field generally perpendicular to the direction of the fluid flow, which constant magnetic field is provided by a magnet assembly 5 comprising a pair of pole face plates 6 and 7, a pair of permanent plate magnets 8 and 9, and flux path structures 10 and 11 connected to one another. The magnetic assembly 5 and the conduit 4 are packaged into one single integral assembly by means of two flanges 12 and 13 with fastening bolts and spacers 14, 15 and 16 made of a non-ferromagnetic material. The conduit 4 providing the flow passage 1 is made of three sections; the two end sections 17 and 18 made of a non-ferromagnetic material such as stainless steel, bronze, plastic or glass, and the NMR (nuclear magnetic resonance) detector section 19 made of an electrically nonconducting diamagnetic material of zero parity such as fluorocarbon plastics, glass or ceramic material. The NMR detector section 19 includes a transmitter coil 20 wound on the outside surface thereof and a receiver coil 21 wound on the outside surface of, or lying within, the NMR detector section 19 near the entry to the transmitter coil 20. The NMR detector section 19 is connected to the two end sections 17 and 18 in a leak proof arrangement that may include ring seals 22 and 23 or bonded coupling. The pole face plates 6 and 7 are plates with polished faces made of a high quality ferromagnetic material such as silicon steel, which are employed to provide a uniform magnetic field intermediate the two pole faces of the magnet over a sizable length in the direction of the fluid flow. The flux path structures including elements 10 and 11 are also made of a ferromagnetic material.

Figure 2:
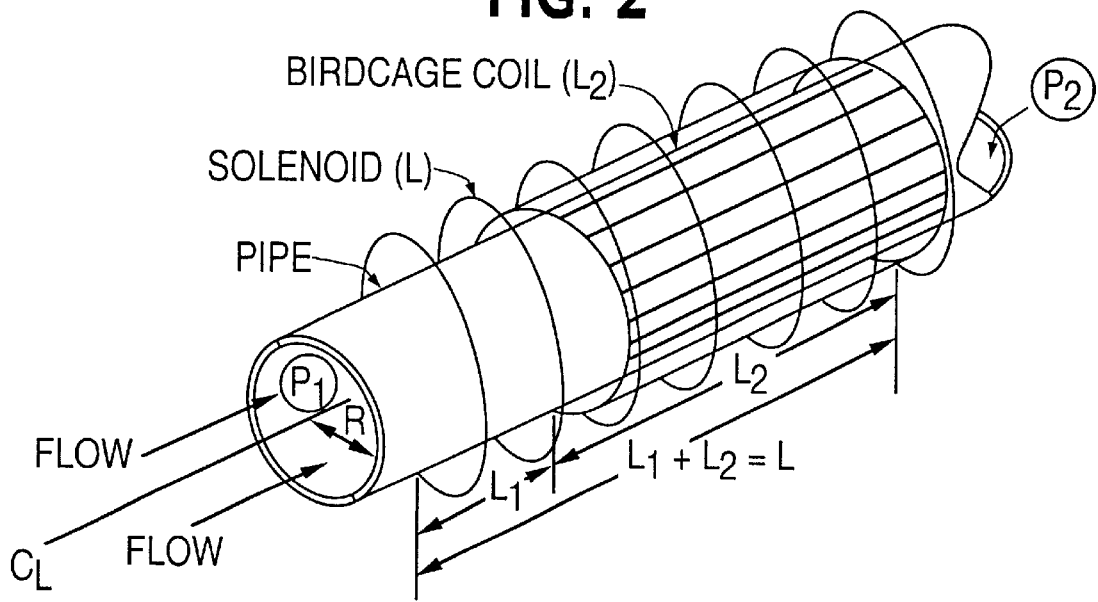
FIG. 2 diagrammatically illustrates a conducting or superconducting solenoidal main magnet for the $H_1$ field and an orthogonal birdcage Larmor r.f. $H_1$ coil which may be used in accordance with another embodiment of the present invention.

FIG. 2 illustrates an alternate but equivalent arrangement where the $H_0$ field is aligned with the mean axis of flow. This figure shows a typical conducting or superconducting solenoidal main magnet for the $H_0$ field and an orthogonal birdcage Larmor r.f. $H_1$ coil as is well known in the art.

The length of either embodiment in FIG. 1 or in FIG. 2 is chosen to make the transit time of the fastest portion of the range of measurement of spin velocities comparable to the $T_1$ spin-lattice relaxation time so as to provide adequate magnetization making the detected signal-to-noise ratio statistically acceptable. Longer magnet sections improve the signal-to-noise ratio of the measurements, increase the cost of the construction and size of the device, but do not significantly affect the theoretical end points, as will become evident in the following development. The apparatus of FIG. 1 is similar to the apparatus described in U.S. Pat. No. 4,782,295 to Lew and the apparatus of FIG. 2 is similar to the apparatus described in U.S. Pat. No. 5,408,180 to Mistretta.

Figure 3:
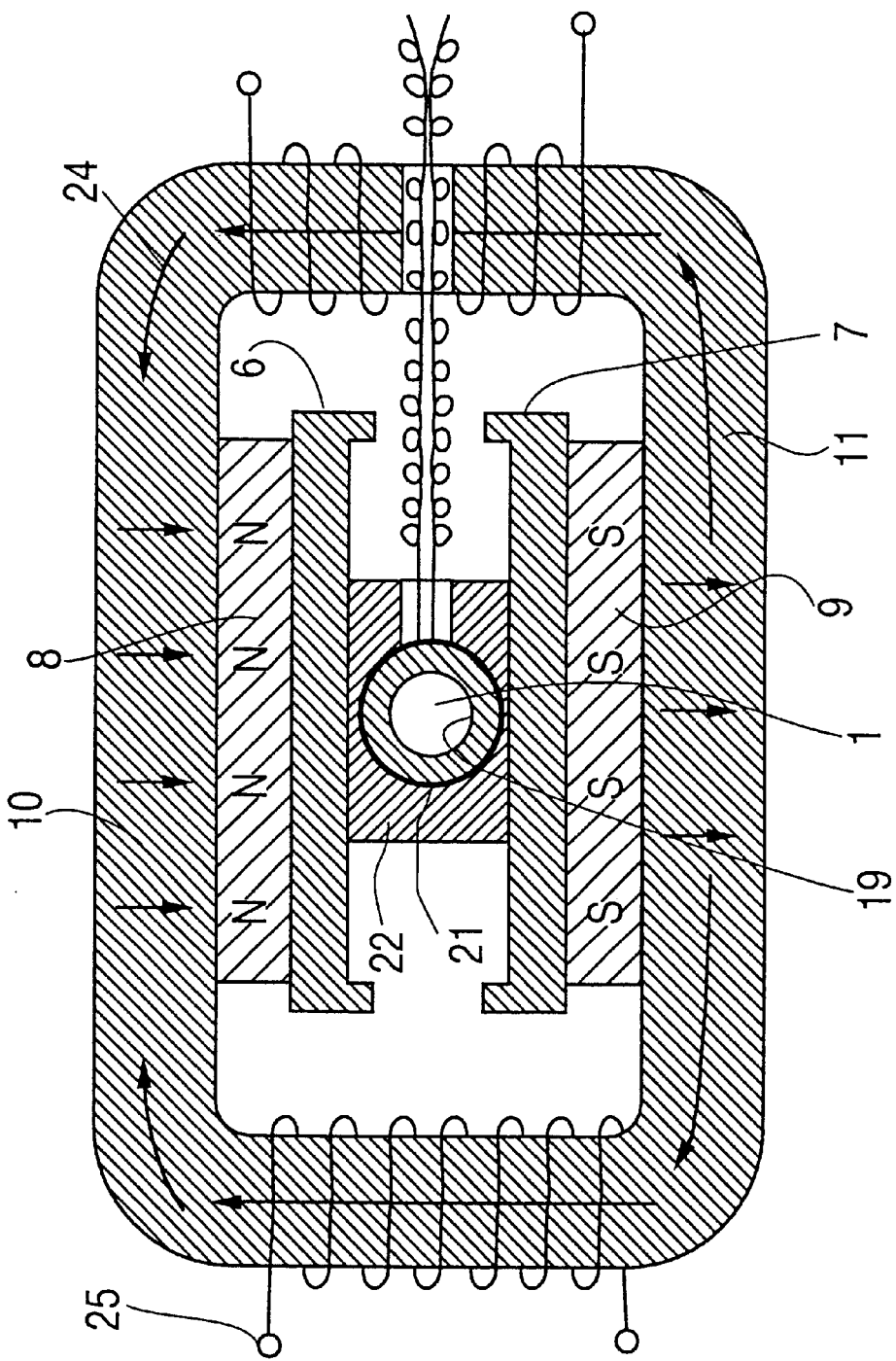
FIG. 3 is a sectional view of the flowmeter of FIG. 1, schematically illustrating the placement of gradient coils for producing a modulating field $h_\phi$ in the detector section.

FIG. 3 depicts one method, but not the only method, whereby a phase-modulating periodic gradient component $h_\phi$ of $H_0$ can be provided for the embodiment of FIG. 1. In a preferred aspect of the present invention, the phase-modulating periodic gradient is an Extremely Low Frequency (ELF) or a Very Low Frequency (VLF) gradient field. FIG. 3 illustrates a method for producing the modulating field 24 of amplitude $h_\phi$ in the detector section preferred for the embodiment of FIG. 1 in which the periodic field of frequency $\Omega$ is created by periodic currents through the gradient coils 25. A spacer 23 made of a nonconducting paramagnetic material of zero parity may be used to secure the detector section. Other conventional gradient coil arrangements, as are well known in the art, can be combined with FIG. 1 or FIG. 2 to provide a periodic spatially ordered component to the $H_0$ main magnetic field (see Shenberg, Itzhak; Macovski, Albert; "Applications of time-varying gradients in existing magnetic resonance imaging systems"; Med. Phys., vol 13(2), p164–169 March 1982, N.Y., U.S.).

Figure 4:
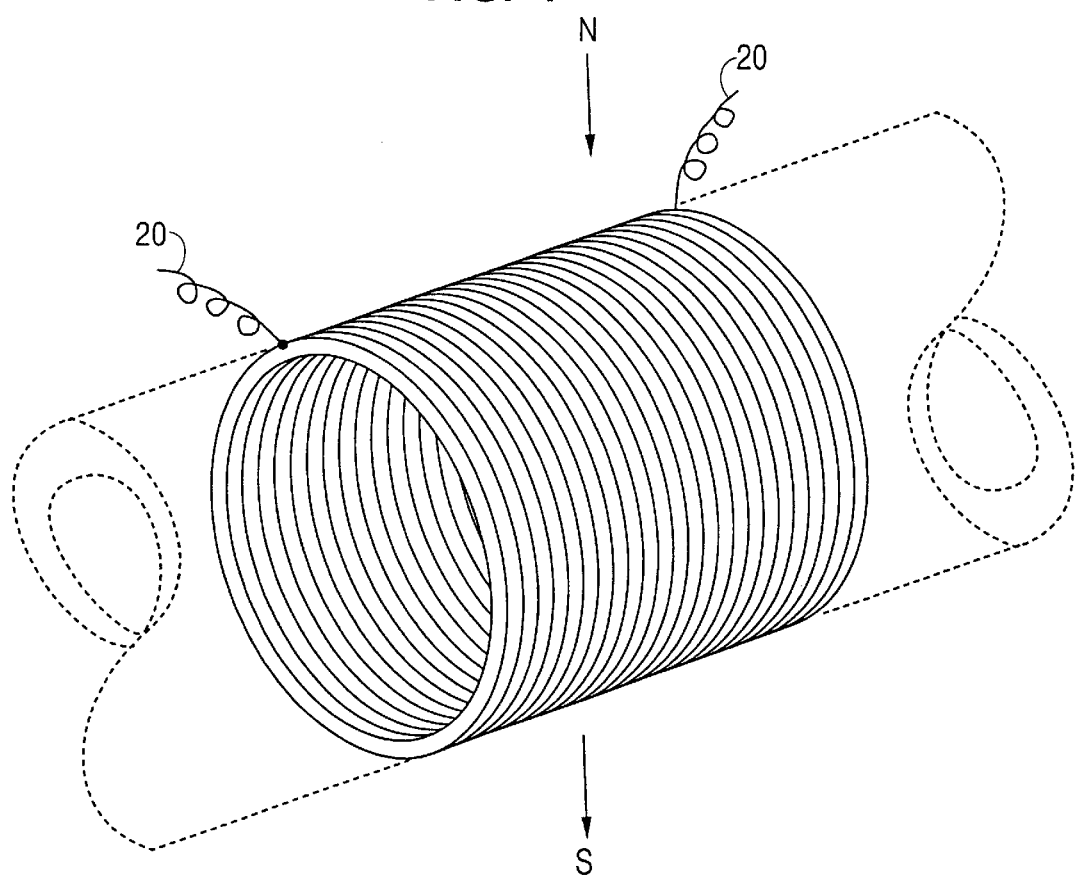
FIG. 4 is a schematic illustration of a Larmor r.f. excitation (nutation) coil for the detector section of the flowmeter shown in FIG. 1.

FIG. 4 illustrates the Larmor r.f. excitation (nutation) coil 20 preferred for the detector section in the embodiment of FIG. 1. FIG. 4 shows how an $H_1$ Larmor frequency excitation field can be continuously applied perpendicular to the $H_0$ main magnetic field in the embodiment of FIG. 1. Conventional $H_1$ r.f. excitation coils of various configurations are well known in the art for both the configuration of FIG. 1 and the configuration of FIG. 2. The strength of the $H_1$ field can be controlled by the amplitude of the radio frequency current in the r.f. coil through current amplifiers, as is well known in the art and this current strength can be varied to alter the signal distribution emitted by the spins in the receiver coil, according to this invention.

Figure 5:
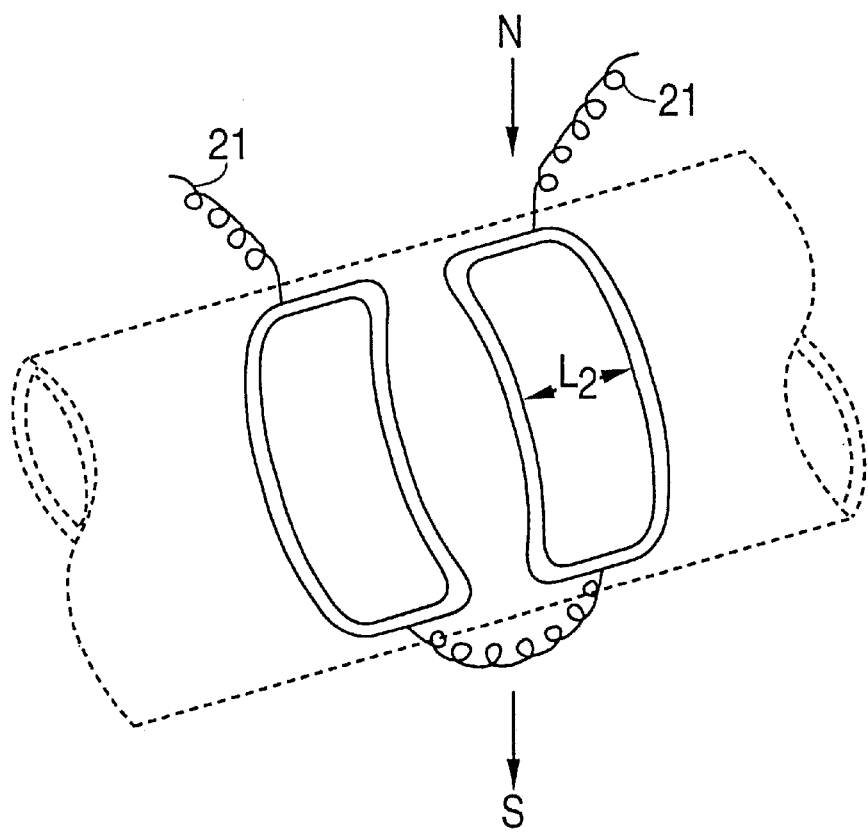
FIG. 5 is a schematic illustration of an r.f. receiving coil for the detector section of the flowmeter FIG. 1.

FIG. 5 illustrates a preferred embodiment of a receiver coil for the configuration of FIG. 1. FIG. 5 demonstrates the r.f. receiving coil 21 of length $L_2$ preferred for the detector section in the embodiment of FIG. 1. This receiver coil, and others suitable for the configuration of FIG. 1 and the configuration of FIG. 2 are well known in the art. The receiver coil of FIG. 5 is preferably placed near the entry of the flow of spins into the $H_1$ Larmor r.f. excitation field and is preferably wound orthogonal to the winding of the $H_1$ excitation field coil to substantially decouple power amplifier noise and signal, as is well known in the art. The length of the receiver coil is preferably short enough so that the transit time of the lowest flow velocities to be measured is short with respect to $T_2^*$ spin-spin spin and D diffusion time effects, which decrease signal amplitude exponentially. This affects the signal-to-noise of the measurement, but not significantly the theoretical end point of the measurement according to this invention.

Figure 6:
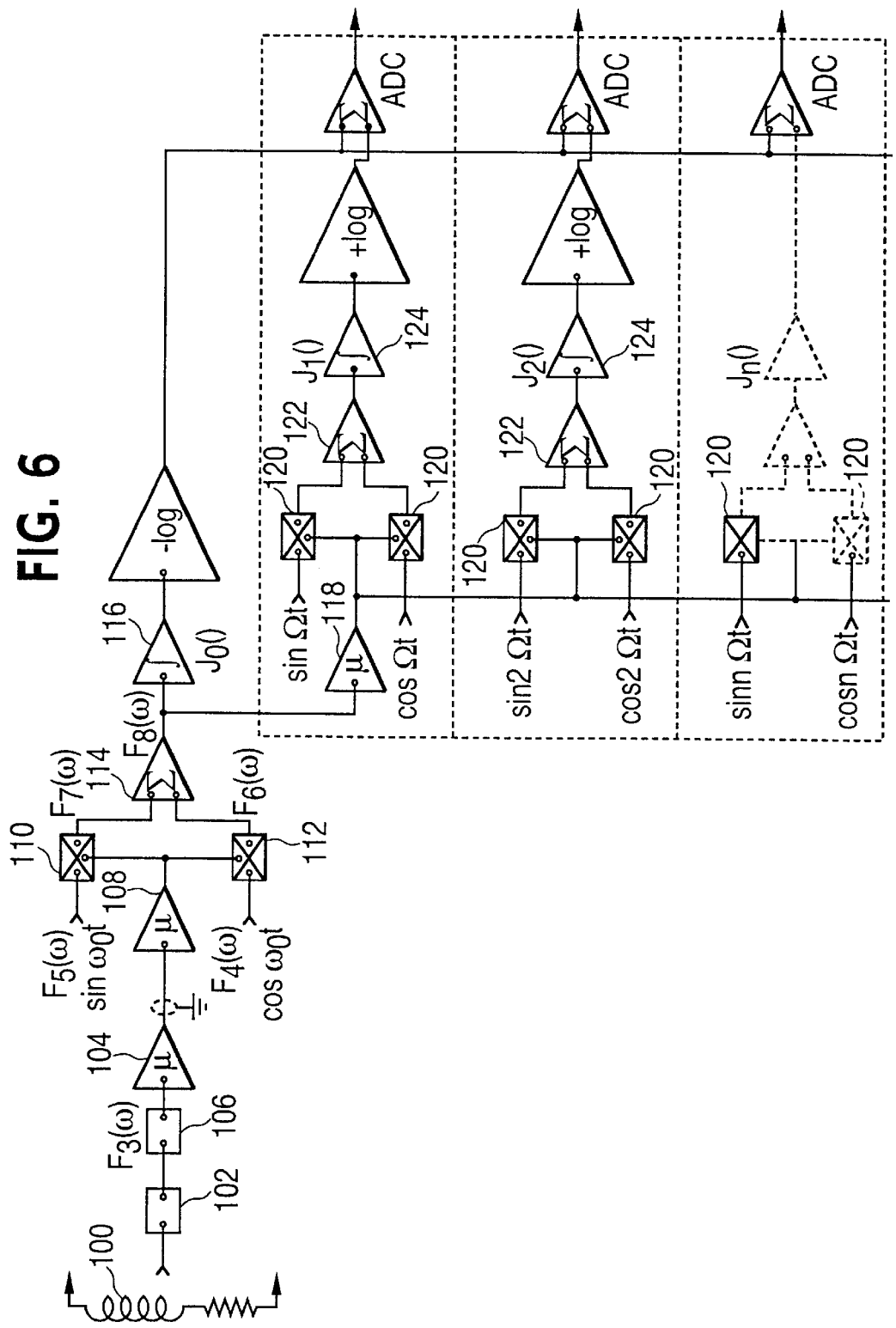
FIG. 6 is a block diagram of a signal processing circuit for use with the flowmeter of FIG. 1 in accordance with one embodiment of the present invention.
Figure 7D:
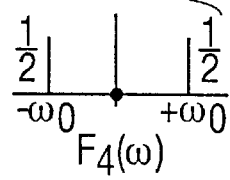
Figure 7E:
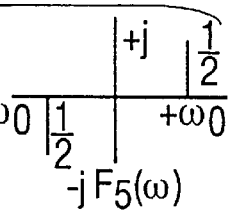
Figure 7F:
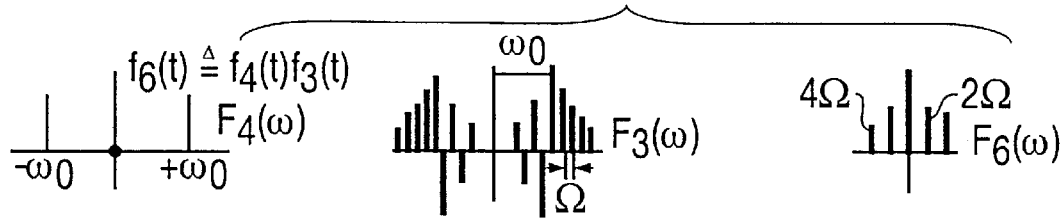
Figure 7G:
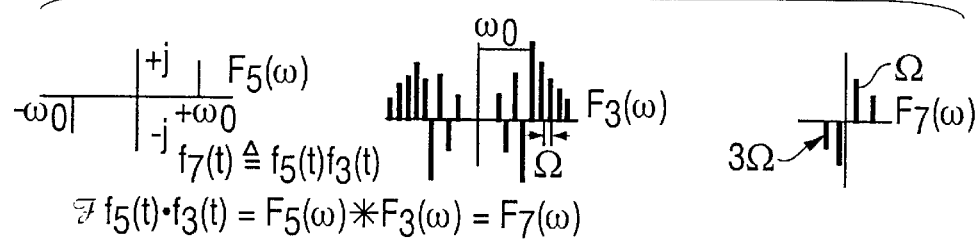
Figure 7H:
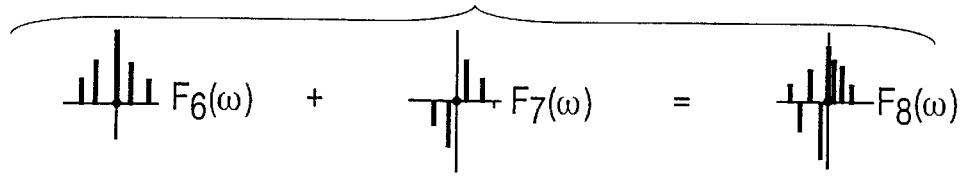
Figure 7I:
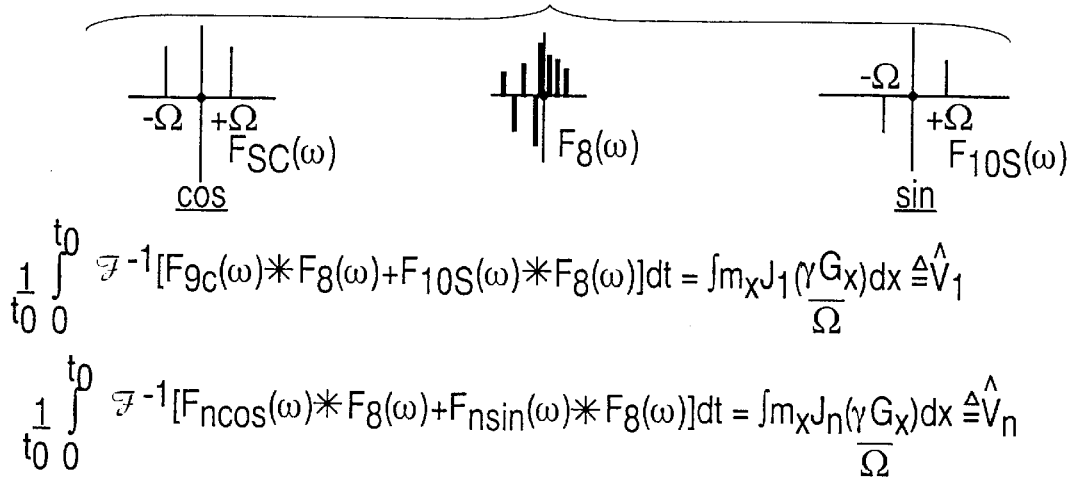

FIG. 6 illustrates a preferred embodiment of a sideband demodulation detector 27 to reject the strong center band signal from the $H_1$ Larmor frequency r.f. excitation field and detect the amplitude of the relevant side bands by cross-correlation with integral multiples of the reference phase modulation frequency. (U.S. Pat. No. 5,757,187 to Wollin, incorporated by reference herein). In FIG. 6, antenna 100 of the magnetic resonance flowmeter receiver coil 21 is coupled to an impedance matching circuit 102, feeding a noise matching preamplifier 104 through a protection circuit 106. The output of the noise matching preamplifier is fed to an RF amplifier 108, the output of which is directed to a double-balanced demodulator 110, 112. The output of the double-balanced demodulator 110, 112 is fed through a summing amplifier 114 to an alternating current integrator 116 and a low frequency amplifier 118. Each of the demodulators 110 and 112 is supplied by a quadrature output from the magnetic resonance master radio frequency oscillator 28, illustrated in FIG. 8. The demodulated outputs are then added at summer 114 to provide a cross-correlated input to the integrator 116 (estimating the direct current $J_0(\ )$ term) as well as to an amplifier 118 that, in turn, feeds additional sets of double-balanced demodulators 120, each of whose added cross-correlated outputs are also summed by summers 122 and integrated by integrators 124, thereby estimating the relative strength of each sideband element of the spectrum, $J_n(\ )$.

FIGS. 7a–7i provide a signal analysis of FIG. 6 showing demodulation and cross-correlation techniques and the generalized output equation from which the flow velocity of the spins can be measured or mapped. As such, FIGS. 7a–7i provide is a stepwise mathematical analysis of the signal processing in the circuit of FIG. 6. (Poularikas, Alexander D., "The Transforms and Applications Handbook" CRC-IEEE press, Boca Raton, Fla., 1996; pages 29, 185, 214, 221).

Figure 8:
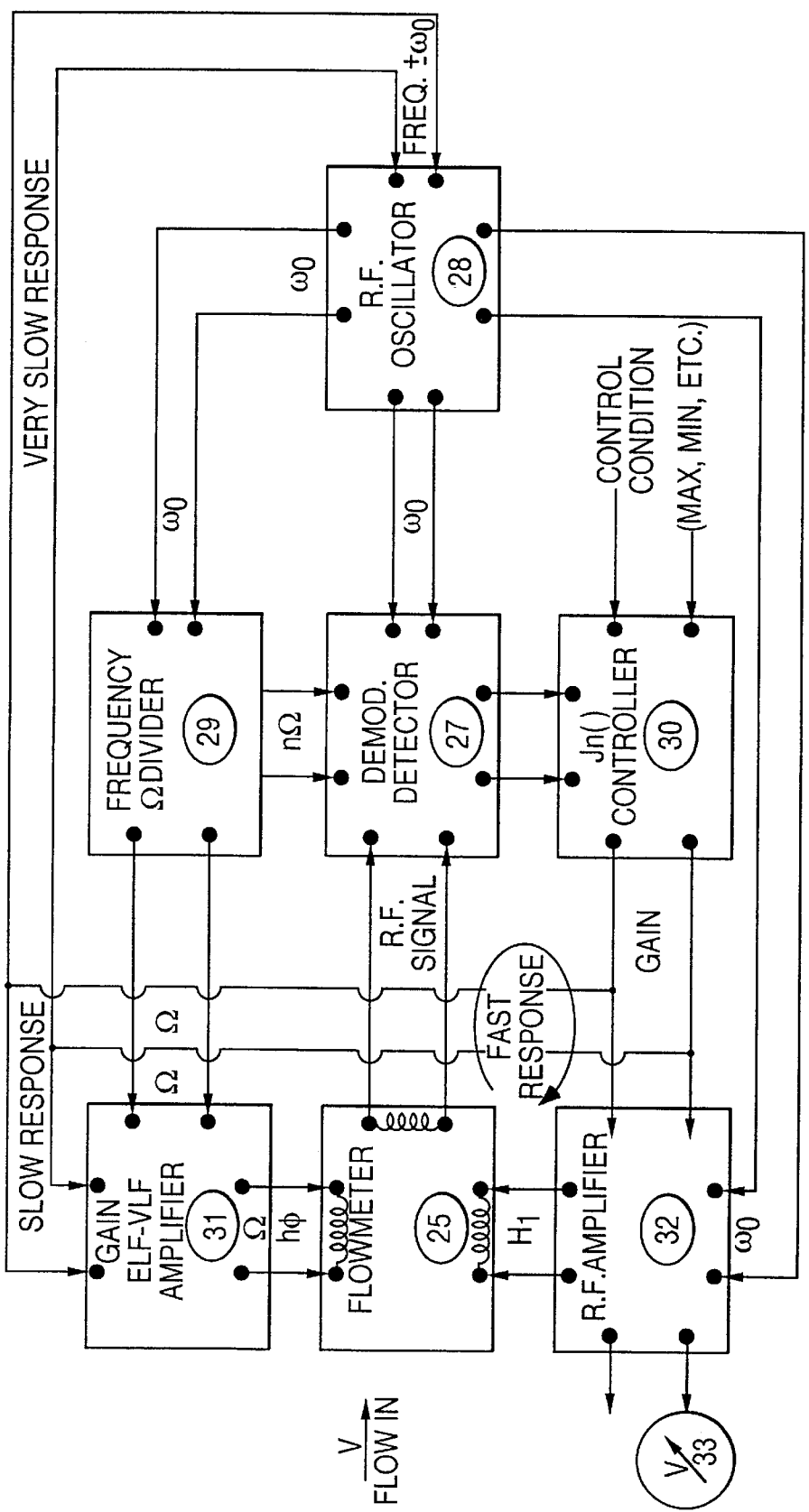
FIG. 8 is an overall system block diagram of one embodiment of the present invention.

FIG. 8 is an overall system block diagram of the invention. In FIG. 8 the flowmeter assembly 26 receiver coil output is fed to the synchronous demodulator and cross-correlation detector 27 for synchronous demodulation with the Larmor r.f. $\omega_0$ oscillator 28 and cross-correlation detection with integral multiples of the phase modulating frequency $\Omega$ from the frequency divider 29. The output of the demodulator-detector 27 is fed to the controller 30 which controls the gain of the r.f. power amplifier 32, whose frequency is controlled by the Larmor r.f. $\omega_0$ oscillator 28, and whose output adjusts the current in the $H_1$ Larmor r.f. coil of the flowmeter assembly 26, so as to set the output of the demodulator-detector 27 to a desired level, as set by the controller 30. This control loop is designed for rapid response, and the current output of the $\omega_0$ r.f. amplifier 32 then measures the flow velocity as described herein. The frequency divider 29 is fed from the r.f. oscillator 28 and controls the frequency $\Omega$ of the amplifier 31, which feeds the phase modulating coils 25 in the flowmeter assembly 26. The gain of the amplifier 31 is controlled by the output of the controller 30 in a strongly damped slowly responding manner, as is well-known in servo-mechanism theory, to secure the highest signal-to-noise level, as described in this invention. The frequency of the $\omega_0$ Larmor frequency oscillator 28 is also controlled by the output of the controller 30 in a very strongly damped very slow-responding manner to secure the highest signal-to-noise level by compensating for any varying load impedence on the $H_1$ r.f. coil, caused by physical changes or chemical shift as is well known in the art. ("Principles of Magnetic Resonance," third edition chapter 4, by Slichter, C. P., Springer-Verlag, N.Y. 1989. ch. 2.8 p 35–39). The current output of the Larmor r.f. power amplifier 32, is a desired measured quantity and is a function of mean flow velocity, as described herein, and is fed to a meter or other suitable indicator or recording device 33. The frequency of the $\omega_0$ Larmor frequency oscillator 29 is a measure of chemical and physical composition of the flowing material ("Principles of Magnetic Resonance," third edition chapter 4, by Slichter, C. P., Springer-Verlag, N.Y. 1989.).

Prior art time-of-flight techniques are more complex, requiring repetitive Larmor r.f. pulses at intervals short with respect to $T_1$, the spin-lattice relaxation constant, which varies with temperature and molecular composition. Prior art Phase-Encoding techniques require gradients in a spin-echo or stimulated echo sequence along a quasi-steady state flow vector. This invention preferably does not employ pulse techniques, is relatively independent of spin relaxation and diffusion, and can rapidly respond to changes in mean velocity of flow in the high Reynolds number measurement mode, or to changes in the velocity profile in the low Reynolds number mapping mode.

Method of Operation

In the measurement mode of operation the amplitude of the current in the $H_1$ Larmor frequency r.f. excitation coil is preferably adjusted to control the amplitude of the measured sidebands in the detection circuit. The $H_1$ field is applied continuously, and preferably not pulsed. The maximum signal, or the minimum signal, or a particular value of the signal in a selected sideband, is preferably chosen as the end-point for measurement of the mean value of the velocity profile; and the magnitude of the current in the $H_1$ r.f. coil required to achieve the chosen signal level is a measured parameter and is a known or measured function of the dwell time of the spins in the defined geometry of the receiver coil, as will be demonstrated herein.

Alternatively, in the mapping mode, the amplitude of the $H_1$ Larmor frequency excitation field is preferably held constant, the amplitude of the phase modulating component of the main strong $H_0$ field is spatially distributed by "gradient coils" (Shenberg, Itzhak; Macovski, Albert "Applications of time-varying gradients in existing magnetic resonance imaging systems"; Med. Phys., vol 13(2), p164–169 March 1982, N.Y., U.S.) and the received sidebands are used in a matrix approximation of the equations at the end of FIG. 7(i). Inverting the matrix or solving by Cramer's rule provides a spatial map of the signal distribution, as is more fully described in U.S. Pat. No. 5,757,187 to Wollin, incorporated by reference herein in its entirety.

As shown in FIG. 8, the controller 30 compares the detected amplitude of the designer selected sideband to a designer selected control condition (i.e., maximum value (eq. 17), minimum value (eq. 18, 19), or some intermediate value chosen for optimum system performance) and thereby creates an error signal of appropriate sense to adjust the gain of the Larmor r.f. power amplifier 32 to meet this design condition. The output current of the Larmor r.f. power amplifier 32 is proportional to the Larmor r.f. excitation (nutation) field strength $H_1$ in coil 20 and, therefore, is a measure of mean flow velocity (eq. 17, 18).

A slower calibration loop measures the mean square error signal output from the controller 30 and adjusts the amplitude of the phase modulating current (according to eq. 25).

Similarly an even slower calibration loop adjusts the frequency of the Larmor r.f. master oscillator 28 to compensate for changes in coil loading, as is well known in the art, ("Principles of Magnetic Resonance," third edition chapter 4, by Slichter, C. P., Springer-Verlag, N.Y. 1989.) permitting estimation of changes in chemical and physical composition of the flowing material.

Theory of Operation

It is well known that a solid or fluid medium of diamagnetic material with a non-zero spin or non-zero parity placed in a constant magnetic field becomes magnetized in accordance with equation:

$$m = K_1 H_0 (1 - e^{-t_1/T_1}) \tag{1}$$

(See, U.S. Pat. No. 4,901,018 to Lew)

where m is the magnetization of the medium, $K_1$ is the magnetic susceptibility, $H_0$ is the intensity of the large static near homogenous main magnetic field, $t_1$ is the mean dwell time of the spins in the $H_0$ field, and $T_1$ is the spin lattice relaxation time, which is a measure of the rate of transfer of energy from the spins to the surrounding medium. Before entering the measurement section, defined by the $H_1$ excitation field, the medium has acquired statistically significant magnetization. The length of the device from its input to the measurement section containing the $H_1$ excitation field is chosen to allow sufficient magnetization of the fastest moving spins to produce adequate signal strength in the presence of the total noise of the device to permit reliable estimation of the desired measurement in each mode of operation. This is preferably achieved by adding additional identical magnetizing sections for measuring or mapping at higher flow rates.

The $H_0$ main magnetic field cause the spins to precess near a Larmor frequency $\omega_0$ where $$\omega_0 = \gamma H_0 \qquad (2)$$

with $\gamma$ being the gyromagnetic ratio, a constant for each spin species. Periodically varying $H_0$ by phase modulating coils, as in FIG. 3, periodically varies $\omega_0$ to produce $\omega_\phi$ where:

$$\omega_\phi = \gamma(H_0 + h_\phi \cos \Omega t) \qquad (3)$$

where $h_\phi$ and $\Omega$ are the amplitude and temporal frequency of the periodic component of $H_0$ and $\omega_\phi$ is the instantaneous angular velocity of precession of the spins about the axis of $H_0$. This amplitude $h_\phi$ can be made a spatial function by time-varying excitation of existing gradient coil sets for mapping velocity or perfusion distributions. (Shenberg, Itzhak; Macovski, Albert; "Applications of time-varying gradients in existing magnetic resonance imaging systems"; Med. Phys., vol 13(2), p164–169 March 1982, N.Y., U.S. and U.S. Pat. Nos. 5,412,322 and 5,757,187 to Wollin)

The $H_1$ excitation field is applied orthogonal to the $H_0$ field, as exemplified in FIG. 4, and is of frequency $\omega_0$. It produces excitation or nutation of the spins at an angular frequency $\omega_1$, where:

$$\omega_1 = \gamma H_1 = \frac{d\theta}{dt} \qquad (4)$$

This nutation produces a component of magnetization perpendicular to the $H_0$ field which can be detected by the voltage it induces in the receiver coil whose area vector is perpendicular to the $H_0$ field, in accordance with Maxwell's Second Law, (see U.S. Pat. Nos. 5,412,322 and 5,757,187 to Wollin, incorporated herein), as detected in the coil exemplified in FIG. 5.

The voltage induced in the receiver coil has a band or line spectrum. This spectrum consists of sidebands equally distributed about the central Larmor frequency by integral multiples of the phase modulating frequency $\Omega$ whose amplitude distribution is defined by the various solutions to Sommerfeld's integral; i.e. Bessel, Neumann, or Hankel functions; and whose width is defined by the $H_0$ static field inhomogeneity and any applied or intrinsic static gradients as analyzed in FIG. 7.

Rejecting the central $\omega_0$ frequency of the signal by demodulation in the presence of the $H_1$ Larmor r.f. field, permits measurement of the sideband amplitudes by cross-correlation with integral multiples of the reference phase modulating frequency $\Omega$ as shown in FIGS. 6 and 7. This permits estimation of the sideband amplitudes without necessarily utilizing pulse techniques, providing that the spins retain significant coherence during their transit through the geometric volume defined by the receiver coil.

During or after excitation by the $H_1$ Larmor r.f. field, spins rapidly lose their phase coherence by many different mechanisms, some of which are adiabatic and, therefore, involve no change in entropy. Those that are not adiabatic involve either passive diffusion (governed by the heat equation) or turbulent displacement or random alterations in the local magnetic field. The net detectable magnetism $m_t$ is exponentially related to the transit time $t_2$ through the $H_1$ field:

$$m_t = K_2 (m \sin \theta) e^{-(t_2/T_2 + DK_3 t_2^3)} \qquad (5)$$

Where $\theta$ is the colatitude of the nutation produced by the $H_1$ field, $T_2$ is the spin-spin relaxation constant, $D$ is the passive diffusion constant of the medium, and $K_3$ is a coefficient containing $\gamma$ and the local gradient field strength. The effect of the exponential term is to reduce signal strength exponentially with the dwell time $t_2$ of the spins in the $H_1$ Larmor r.f. field, which effect dictates that short receiver coils be used in slow flow applications. Several such short coils may be arranged sequentially and connected in series to permit selection of the lowest range of flow velocities to be measured.

The receiver coil exemplary in FIG. 5 is preferably wound orthogonal to the $H_1$ Larmor radio frequency excitation coil to minimize noise coupling and excitation signal coupling between the excitation r.f. power amplifier circuitry and the receiver circuitry.

During transit through the $H_1$ Larmor r.f. excitation field, the spins nutate through a colatitude angle $\theta$, as is well known in the art (Slichter, C. P.; "Principles of Magnetic Resonance"; Springer-Verlag, New York; Third Edition, 1989, Chapter 2). The detectable transverse magnetization then varies as the spins traverse the receiver coil within the $H_1$ excitation field, since from eq (4):

$$\omega_1 = \frac{d\theta}{dt} = \gamma H_1 \qquad (6)$$

$$\theta = \gamma H_1 t_2 \qquad (7)$$

and from eq(1) and eq(5)

$$m = K_1 K_2 H_0 (1 - e^{-t_1/T_1}) e^{-t_2/T_2^*} \sin \gamma H_1 t_2 \qquad (8)$$

where $T_2^*$ is the effective $T_2$, which includes spin-spin relaxation, diffusion, and local field inhomogeneity etc., as is well known in the art.

Defining $$t_2 = \frac{l}{v}; \qquad (9)$$

$$t_1 = \frac{L_1}{v} \qquad (10)$$

where $v$ is the velocity of each element in the velocity profile of each flow domain.

Then the total receiver coil transverse magnetization $M_T$ for each element of $v$ is $$M_T = KH_0 \left(1 - e^{\frac{-L_1}{vT_1}}\right) \int_0^{L_2} e^{\frac{-l}{vT_2^*}} \sin\left(\frac{\gamma H_1}{v} l\right) \frac{dl}{v} \qquad (11)$$

where $K$ is a constant $H_0$ is the main magnetic field strength, a design constant $H_1$ is the excitation field strength, controllable in the device $L_1$ is the effective length of the $H_0$ field, chosen for each maximum range of flow.

$L_2$ is the effective length of the receiver coil, chosen for each minimum range of flow.

l is the distance traveled by each element of the medium through the sensitive volume of the receiver coil; eq. 9

$T_1$ is the spin-lattice relaxation time of the medium which typically ranges between 0.1–5 seconds.

$T_2^*$ is the effective free induction decay damping coefficient which typically varies between 50–500 msecs.

v is the velocity of each element of the velocity profile

If the $L_1$ magnetizing sections are long enough, i.e.

$$L_1 \gg vT_1 \qquad (12)$$

and the $L_2$ receiver coil is short enough, i.e.

$$L_2 \ll vT_2^* \qquad (13)$$

then $$M_T = KH_0\left(\frac{1}{\gamma H_1}\right)\left(1 - \cos\frac{\gamma H_1 L_2}{v}\right) \qquad (14)$$

for each element of velocity v in each velocity profile.

For a velocity profile of mean value v within the receiver coil, the maximum net magnetization $M_T$ (max) is:

$$M_T = KH_0\left(\frac{1}{\gamma H_1}\right)(2) \qquad (15)$$

when $$\frac{\gamma H_1 L_2}{v} = \pi \qquad (16)$$

or $$v = \left(\frac{\gamma L_2}{\pi}\right)H_1 \qquad (17)$$

The minimum net magnetization is zero or minimum when $$\frac{\gamma H_1 L_2}{v} = 2\pi \qquad (18)$$

or $$v = \left(\frac{\gamma L_2}{2\pi}\right)H_1 \qquad (19)$$

For protons $$\gamma = 2\pi(4.26 \times 10^7)(\mu_0)\left(\frac{\text{sec-amp}}{\text{meter}}\right)^{-1}$$

or $$v = (4.26 \times 10^7)(4\pi \times 10^{-7})L_2 H_1 \qquad (20)$$

$v = 53.7 \, L_2 H_1$ with $H_1$ in amp/meter. For a four cm wide receiver coil, for example, $$v = 2.14 \, H_1 \text{ meters/second} \qquad (21)$$

Thus, adjusting $H_1$ field strength to obtain a specified sideband signal yields the mean velocity of flow.

As is more completely shown in Wollin, U.S. Pat. No. 5,757,187, symmetrical even spatial spin signal distributions produce only even order sidebands and asymmetrical odd distributions produce only odd order sidebands; from FIG. 7(i) and $$J_{(-n)}(z) = -1^n J_{(n)}(z) \qquad (22)$$

(Jahnke, E.; Emde, F.; Tables of Functions, 4th edition, Dover Publications, New York 1945, p.128.) Therefore, if the velocity profile is symmetrical, only even order sidebands will be present, making detection of the second sideband preferable, with a maximum value of $$J_n\left(\frac{\gamma h_\varphi}{\Omega}\right) \cong J_2(3.2) \cong 0.49 \qquad (23)$$

or $$\frac{\gamma h_\varphi}{\Omega} \cong 3.2 \qquad (24)$$

and $$h_\varphi \cong \frac{3.2}{337}\Omega \cong .95 \times 10^{-2}\Omega \qquad (25)$$

The minimum value of the phase modulation frequency $\Omega$ must be greater than the band width $\Delta\omega_0$ of the Larmor frequency (Shenberg, Itzhak; Macovski, Albert, "Applications of time-varying gradients in existing magnetic resonance imaging systems"; Med. Phys., vol 13(2), p164–169 March 1982, N.Y., U.S., eq.3) which is determined by the homogeneity of the main magnetic field $H_0$ and any applied or intrinsic static gradients. $\Delta\omega_0$ also determines the minimum Johnson-Nyquist noise power $P_n$ which is identical in each sideband FIG. 7(c) as $$P_n = K_b \tau \Delta\omega_0 \qquad (26)$$

where $K_b$ is Boltzmann's constant and $\tau$ is the absolute temperature.

Measurement of a mean velocity of flow in a flow profile does not require absence of turbulence. Linear components of fluid momentum perpendicular to the mean axis of flow do not appreciably affect magnetization by the uniform magnetic field $H_0$, spin nutation by the uniform $H_1$ excitation r.f. Larmor field, or signal reception by the short receiver coil since such linear components are small compared to the mean fluid momentum. Relatively slow components of rotational momentum permit adiabatic spin alignment with the main magnetic field $H_0$ ("Principles of Magnetic Resonance," third edition chapter 4, by Slichter, C. P., Springer-Verlag, N.Y. 1989, p. 23) and should not significantly dephase the spins if the time of transit through the receiver coil is short. However, strong translational and rotational components of momentum producing "eddy currents" are known to produce signal loss (Cho, Z. et. al.; "Foundations of Medical Imaging;" John Wiley & Sons, Inc., New York, 1993, p374–386) and are avoided by proper methods of meter pipe design and, if necessary, by flow conditioners, as is known to those skilled in the art. (Spitzer, David W. "Industrial Flow Measurement;" Instrument Society of America, 1990, p 97).

In the slower laminar regimens of flow, at low Reynolds numbers, the velocity profile may be mapped (U.S. Pat. No. 5,757,187 to Wollin) or the mean value determined as above. However, very slow flowing spins near the pipe wall will be subject to signal loss by $T_1$ and $T_2^*$ effects, tending to increase the measured mean velocity of flow.

For a non-uniform velocity profile, at lower Reynold's numbers, the effect of varying $H_1$ on the signal distribution or signal mean value is far more complex and is more completely developed for both mapping or measurement in U.S. Pat. No. 5,532,592 to Maneval and in U.S. Pat. No. 5,757,187 to Wollin.

Therefore, as is shown above, controlling the current in the $H_1$ excitation coil to produce a selected side band amplitude in the receiver circuit output measures the mean velocity of flow. Non-uniform velocity profiles may be mapped by continuously inverting the matrix equation containing the sideband amplitudes, approximately the integral FIG. 7($i$) (U.S. Pat. No. 5,757,187 to Wollin). Turning the r.f. $\omega_0$ generator for maximum power match between the $H_1$ excitation coil and the flowing medium yields an estimate of the chemical and physical composition of the flowing material (Slichter, op.cit.).

It should be noted while nuclear magnetic resonance methods have been described above, the principles and embodiments of this invention are applicable to either nuclear or electron magnetic resonance.

While the above description has been concerned with determining the velocity of fluid in pipe using a flow meter, the method and apparatus of the preferred embodiments of the present invention may be used to determine the velocity of a moving pipe in a fluid (i.e., a speedometer). Therefore, since the flow meter described above and illustrated in FIGS. 1–3 measures the relative velocity between a pipe and a fluid, the flow meter may be attached to a boat or other body moving in a fluid to determine the velocity of the boat or other moving body relative to a stationary or moving fluid.

Furthermore, the principles and embodiments of this invention apply not only to liquid or gas fluid flow in pipes, but also to flow of other fluid materials, such as mixtures, slurries, aggregates, blowing particles, viscous plastic as well as to the conveyance of solid material through a flow meter device.

Preferred embodiments of the invention have now been described. It will be appreciated by those skilled in the art that such embodiments are intended to exemplify the invention. Various other embodiments of the invention will be apparent, which fall within the spirit and scope of the invention.

I claim:

1. A method for non-invasively determining a mean value of a relative velocity between a material and a container, comprising:

applying a strong time-invariant magnetic field $H_0$ to the container;

applying a phase modulating periodic component $h_\phi$ to the strong time-invariant magnetic field $H_0$ over a detection section of the container;

applying a Larmor radio frequency excitation (nutation) field $H_1$ to said detection section of the container, orthogonal to the $H_0$ field;

receiving signals from nutating phase-modulated magnetic resonance spins in the material in the detection section of the container; and determining the mean value of velocity from a measured mean dwell time of the magnetic resonance spins within the material in the detection section of the container.

2. The method of claim 1, wherein said container comprises a cylindrical pipe and said detection section comprises a section of the pipe to which the field component $h_\phi$ and field $H_1$ are applied.

3. The method of claim 1, wherein said Larmor radio frequency excitation field $H_1$ is applied to a signal sensitive volume of a receiver coil tuned near a Larmor frequency $\omega_0$.

4. The method of claim 3, further comprising periodically phase modulating the magnetic resonance spins within the detection section by periodically modulating the field $H_0$ in the detector section at a frequency $\Omega$, which is much smaller than the Larmor requency $\omega_0$.

5. The method of claim 4, further comprising:

demodulating the signals from the phase-modulated magnetic resonance spins received by the receiver coil by convolution with a frequency of the Larmor frequency $\omega_0$ citation field $H_1$; and detecting the demodulated signals by cross-correlation with multiples of the modulating frequency $\Omega$ of the phase modulating periodic field component $h_{100}$.

6. The method of claim 5, wherein the strength of the Larmor radio frequency excitation $H_1$ field is adjusted to produce a maximum, minimum, or other defined level of the signals detected by the receiver coil or coils.

7. The method of claim 6, further comprising:

shifting a frequency $\omega_0$ of the $H_1$ excitation field to create an impedance match to the material moving within the container; and measuring changes in chemical and physical composition of the moving material manifested by a shift of their Larmor frequency.

8. The method of claim 5, further comprising adjusting an amplitude of the phase modulating periodic field component $h_\phi$ of the magnetic field $H_0$ to achieve a maximum obtainable detected signal output.

9. The method of claim 2, wherein the material comprises a liquid or gas fluid moving along an axis of the pipe.

10. The method of claim 2, wherein the material comprises a slurry, aggregate, blowing particles, a viscous plastic or solid material moving along an axis of the pipe.

11. The method of claim 1, wherein the container comprises a speedometer which moves with respect to the material and which measures or maps the mean velocity of the container.

12. The method of claim 1 wherein the container comprises a flow meter which is stationary with respect to the moving material and which measures or maps the mean velocity of the moving material.

13. The method of claim 1, further comprising:

periodically varying the $H_0$ main magnetic field by the periodic component $h_{100}$ so as to phase modulate the spins and cause the spins to emit a line or band spectrum, centered at the Larmor frequency, whose sideband amplitudes are known functions of the amplitude of the center-band Larmor frequency signal emitted by the spins, said emitted center-band Larmor frequency signal amplitude being a known measured function of the dwell time of the spins contained within the receiver coil located adjacent the Larmor radio frequency excitation field $H_1$ in the detection section.

14. The method of claim 13, further comprising:

demodulating and then cross-correlating the sidebands of the received signal with integral multiples of the phase modulating frequency $\Omega$ of the periodic component field $h_\phi$ to continuously measure or map the relative mean velocity.

15. The method of claim 1, wherein the Larmor radio frequency excitation field $H_1$ is a continuous, non-pulsed field.

16. The method of claim 1, further comprising spatially ordering an amplitude of the periodic phase modulating component field $h_{100}$ to directly spatially map a dwell time of the spins within the detection section.

17. The method of claim 3, wherein the receiver coil is wound orthogonal to an Larmor excitation field $H_1$ coil so as to decouple a noise from, and a signal from, the Larmor excitation field $H_1$; and measuring or mapping a dwell time of the spins within the a signal sensitive volume of the receiver coil to measure or map the velocity or perfusion vector of the spins.

18. The method of claim 1, further comprising:

measuring a dwell time of the spins in the detection section by adjusting the strength and distribution of the $H_1$ Larmor radio frequency excitation field; and constructing the flow velocity profile or estimating the mean flow velocity or perfusion vector therefrom;

wherein said method not being significantly dependent on the unknown $T_1$ spin-lattice, the unknown $T_2$ spin-spin, the unknown D diffusion, or on other unknown parameters affecting spin magnetization, spin diffusion, or spin coherence.

19. The method of claims 1, wherein pulsed fields, are not used to determine the mean velocity.

20. The method of claim 1, further comprising:

shifting a frequency of the radio frequency excitation field $H_1$ to compensate for changes in a magnetic resonance frequency of the spins in the material caused by chemical shift or changes in susceptibility in a local spin environment; and simultaneously estimating changes in physical and chemical composition of the flowing material.

21. A velocity measurement apparatus, comprising a cylindrical container;

source of a strong time-invariant magnetic field $H_0$;

a source of a phase modulating periodic component $h_\phi$ applied to the strong time-invariant magnetic field $H_0$ adjacent a detection section of the container;

a source of a Larmor radio frequency excitation field $H_1$ adjacent a detection section of the container;

a receiving coil adjacent to a detection section of the container; and a velocity determining circuit electrically coupled to the receiving coil.

22. The apparatus of claim 21, wherein the cylindrical container comprises a pipe.

23. The apparatus of claim 22, wherein the source of a strong time-invariant magnetic field $H_0$ comprises permanent or resistive magnets located adjacent to the pipe or a solenoid magnet wound around the pipe.

24. The apparatus of claim 23, wherein the source of a phase modulating periodic component $h_\phi$ comprises a coil wound adjacent to detection section of the said pipe.

25. The apparatus of claim 24, wherein the source of Larmor radio frequency excitation field $H_1$ comprises a cylindrical or a bird cage radio frequency emitting coil adjacent the detection section of the said pipe.

26. The apparatus of claim 25, wherein the receiver coil is wound orthogonal to the Larmor radio frequency excitation field $H_1$ emitting coil.

27. The apparatus of claim 21, wherein the velocity determining circuit comprises:

a Larmor frequency oscillator;

a frequency divider which supplies a reference phase modulation frequency;

a sideband detector which detects an amplitude of sidebands of a received signal by cross-correlation with integral multiples of a reference phase modulation frequency; and an amplifier which provides an output velocity signal.

28. A velocity measurement apparatus, comprising means for providing a material;

means for providing source of a strong time-invariant magnetic field $H_0$;

means for providing a phase modulating periodic component hp applied to the strong time-invariant magnetic field $H_0$;

means for providing Larmor radio frequency excitation field $H_1$;

means for receiving a radio frequncy signal from the material; and means for determining a relative velocity between the material and the means for providing the material.

29. The apparatus of claim 28, wherein means for providing a material provides a moving material and the means for determining determines the velocity of the moving material.

30. A method for non-invasively mapping a velocity profile of, or measuring a mean value of, a flow velocity field comprising directly determining a mean dwell time of flowing spins within a material in a defined space subjected to a continuous, non-pulsed $H_1$ Larmor radio frequency excitation field.

31. A method for non-invasively mapping a velocity profile of, or measuring a mean value of, a flow velocity field comprising:

directly determining a mean dwell time of flowing spins within a material in a defined space subjected to a continuous, non-pulsed $H_1$ Larmor radio frequency excitation field;

applying a $H_0$ strong main magnetic field to the material;

periodically varying the $H_0$ strong main magnetic field by a periodic gradient field $h_\phi$ so as to phase modulate the spins which then emit a line or band spectrum, centered at a Larmor frequency, whose sideband amplitudes are known functions of an amplitude of a center-band Larmor frequency signal emitted by the spins, said emitted center-band Larmor frequency signal amplitude being a directly known function of the dwell time of the spins within a defined space within the $H_1$ Larmor radio frequency excitation field.

32. The method of claim 31, further comprising demodulating and then cross-correlating the sidebands of a received signal with integral multiples of a phase modulating frequency $\Omega$ of the periodic gradient field $h_\phi$ to continuously measure or map the relative mean velocity.

33. The method of claim 32, further comprising spatially ordering an amplitude of the periodic gradient $h_\phi$ field and directly spatially mapping the mean dwell time of spins.

34. The method of claim 32, wherein a receiver coil is wound orthogonal to an $H_1$ Larmor excitation field coil so as to decouple a noise from, and a signal from, the $H_1$ Larmor excitation field; and measuring or mapping the dwell time of the spins within a signal sensitive volume of a receiver coil to measure or map the velocity or perfusion vector of the spins.

35. The method of claim 30, further comprising:

measuring the dwell time of the spins in the defined space by adjusting a strength and distribution of the $H_1$ Larmor radio frequency excitation field; and constructing a flow velocity profile or estimating a mean flow velocity or perfusion vector therefrom;

wherein said method not being significantly dependent on the unknown $T_1$ spin-lattice, the unknown $T_2$ spin-spin, the unknown D diffusion, or on other unknown parameters affecting spin magnetization, spin diffusion, or spin coherence.

36. The method of claim 30, further comprising:

shifting a frequency of the $H_1$ radio frequency excitation field to compensate for changes in the magnetic resonance frequency of the spins in the material caused by chemical shift or changes in susceptibility in the local spin environment; and simultaneously estimating changes in physical and chemical composition of the flowing material.

* * * * *